Patented July 1, 1947

2,423,212

UNITED STATES PATENT OFFICE 2,423,212

VITREOUS ENAMEL OPACIFIER

Virgil H. Waite, Berea, and Harry Burnham Allport, Cleveland, Ohio, assignors to The McGean Chemical Company, Cleveland, Ohio, a corporation of Ohio Application June 13, 1942, Serial No. 446,977

30 Claims. (Cl. 106—312)

This invention relates to vitreous enamel opacifiers; and it relates more particularly to compositions suitable for use as mill addition opaquing or opacifying agents, in conjunction with presmelted enamel frit and other constituents of an enamel mix, for production of white vitreous or porcelain enamels especially. Although at present of primary utility in the field of white vitreous enamels, the invention is useful in the production of colored enamels also.

In the manufacture of white enameled ware, for example, it has long been common practice to produce by a two-step procedure the complete enamel composition that is to form the finished enamel or cover coat fired on the ware. In the first step a glassy frit, which is later to constitute much the greater part of the milled enamel mix but the components of which are such as to supply, at most, only a part of the opacity required in the finished enamel, is prepared by smelting a raw frit batch or mixture composed of the necessary ingredients in manner well understood in the art. This smelting is conducted at sufficiently high temperatures (e. g. 1900°–2100° F.) to bring about complete fusion of the batch, and it continues long enough (usually a matter of several hours) to ensure completion of the desired reactions among the basic and acidic constituents of the molten mass and until the mass is of substantially uniform composition throughout. The molten frit is then quenched to chill it suddenly, thereby fragmenting and somewhat coarsely comminuting it. In the second step, this comminuted frit, together with certain suitable materials known as mill additions, admixed therewith in proper proportions to give the complete raw enamel batch the desired composition as well as the physical properties adapting it for application to the ware preparatory to firing, are finely ground in a mill, such as a ball mill. Where the wet process of enameling is to be used, the milled batch includes water and the resultant fluid material is called "slip." One of the aforesaid "mill additions" is an enamel opacifier of such character and employed in such quantity as to give the fired enamel coat, so far as is possible, the desired opacity or degree of light reflectance, as well as the desired quality of whiteness. As is well known, the firing or burning of the enamel mix applied to the ware in the form of a slip or otherwise takes place at lower temperatures (e. g. around 1500° F.) than smelting and is completed much more quickly, usually in only a few minutes.

It is with the composition and character of mill addition opacifiers specifically so designated that the present invention has to do; and a general object of the invention is to provide improved methods of preparing mill addition opacifiers and, also, to provide novel opacifiers of this type that are especially well adapted for use in production of high-grade vitreous enamels.

Besides having to be sufficeintly hard, tough, strong and tenaciously adherent to its base, and usually also acid-resistant, in order to be acceptable to the trade, a white vitreous enamel must satisfy highly exacting requirements as to pleasing appearance if it is to be classed as first grade enamel. Chief among these are a high degree of opacity or reflectance, and whiteness. The ability of the enamel to meet these requirements satisfactorily is profoundly affected by the nature of the mill opacifier used in producing it.

For many years, tin oxide has been quite generally used as a mill addition opacifier for producing the better grade white vitreous enamels because of the highly satisfactory results consistently obtainable therewith. Zirconium oxide also was and still is used for this purpose to some extent, but the objections inherent in its use, due to certain definitely adverse effects upon the properties of the resultant enamel, have been generally recognized as materially limiting its utility as a substitute for tin oxide in the mill. Employment of tin oxide as the mill addition opacifier, besides favorably affecting the other properties of the finished enamel, endows it with opacity and whiteness so satisfactory as to afford a recognized standard of comparison by which to appraise the suitablility for this purpose of any proposed substitute for tin oxide. However, the increase in cost of tin oxide, especially during the last decade, has rendered its use as a mill addition opacifier so expensive as to stimulate persistent and long-continued efforts to find a satisfactory material to replace it for that purpose. Although some progress toward this objective has been made, it has been desultory, with more or less inconsistent and confusing results. Certain types of compositions allegedly suitable for the purpose have been proposed, and a very few such compositions have been found usable to some extent. But, perhaps because of the complexity of the problem as a whole and because of the empirical nature of the art, knowledge concerning it, the available teachings concerning such proposed substitutes for tin oxide have been so inadequate, and in some respects so misleading, that workers in the vitreous enamel art have had relatively little dependable guidance heretofore in trying to solve the problem satisfactorily.

One material heretofore proposed for replacing tin oxide as a mill addition opacifier in producing white vitreous enamel is said to be the product of reacting chemically between the oxides of calcium, antimony, and titanium; the aforesaid oxides (or compounds yielding them under the conditions of operation) being calcined in a mixture thereof so proportioned as to give a reaction product whose composition, although variable slightly within narrow limits, is described as approximating the molecular formula:

$$2CaO.Sb_2O_5.3TiO_2$$

which may also be written $$(2CaO)(Sb_2O_5)(3TiO_2)$$

The addition of calcium fluoride to the calcination mix has also been recommended in order to correct the yellowish coloration which was thought to be imparted to the fired enamel by the titanium oxide content of the calcined opacifier product added in the mill. The present applicants have found that such yellowish coloration is a function of the antimony content of such opacifier, rather than of the titanium content.

Other opacifiers of somewhat similar general type heretofore proposed conform approximately to such molecular formulae as $$(2K_2O)(7.5TiO_2)(2.3Sb_2O_5)$$

and $$(1.61CaO)(.33K_2O)(.024Na_2O)(.036MgO)(1.93TiO_2)(.526Sb_2O_5)(.762CaF_2)$$

In these opacifiers, however, all or a substantial part of the calcium oxide component is replaced by other basic components, particularly by one or more alkali metal oxides such as the oxides of potassium and sodium, which the present applicants have found to be highly undesirable because of resultant adverse effects upon the properties of the opacifier compositions.

Another prior proposal is to calcine a mixture that will give a reaction product said to have the composition:

$$(Sb_2O_5)(TiO_2)(2CaF_2)(2.5CaO)$$

The abnormally high calcium fluoride content of the product just mentioned puts it virtually in a class by itself, giving it characteristics that differentiate it from other proposed opacifiers of the prior art and still more from the novel opacifiers of the present invention which are notably superior thereto.

Neglecting the calcium fluoride component, all or most of which, when included in the mix, goes through the calcining operation unchanged and persists as such in the final calcined product, it will be seen from the foregoing that mill addition opacifiers consisting essentially of what may be regarded as chemical combinations of the oxides of calcium, titanium and antimony have been heretofore proposed, broadly speaking. However, although they differed somewhat from each other in respect to the proportioning of the three essential oxide components, little or nothing seems to have been known as to why a particular proportioning was adopted in any given instance. The various specific formulae recommended were apparently hit upon quite empirically. Moreover, in attempting to follow the teachings of the disclosures concerning them, the skilled worker in the art finds it difficult or impossible to achieve with any reasonable certainty or regularity the successful results assertedly obtainable. Furthermore, if it be attempted to prepare opacifiers of this type in accordance with the teachings of said disclosures, but with somewhat different proportioning of the essential oxide components, wholly erratic and contradictory results are obtained because of the absence of any teaching as to how such proportioning may be varied while still obtaining opacifier compositions of the desired character.

In the 3-oxide combination represented by the general molecular formula $xCaO.ySb_2O_5.zTiO_2$, where $x$, $y$ and $z$ may have any numerical values, the calcium oxide is a basic component, while the antimony oxide and titanium oxide are acid components. In a calcining operation that produces a reaction product of the type represented by the general formula just given, the basic and acidic components, for convenience hereinafter sometimes designated "B" and "A," respectively, may combine in various ways, depending mainly upon the given proportioning of the oxide components. Thus, because the possible variations in the proportioning of these components are infinite in number, the resultant reaction products may be infinitely varied in specific character. Only certain of these products are suitable to employ as mill addition opacifiers for white vitreous enamel. Whether a given one of these products is or is not suitable or acceptable for such purposes could not be foretold heretofore.

The present invention is based upon the discovery that, in order to be able consistently to produce opacifiers of the 3-oxide type that may vary widely in specific proportioning but yet remain satisfactory as mill additions for producing white vitreous enamel, it is necessary, whether or not calcium fluoride or other fluoride is included in the opacifier composition, to so proportion the three essential oxide components relatively one to another that a predetermined relationship or coordination, variable within definite limits, is established between the following two factors: (1) the molecular ratio of titanium oxide to antimony oxide, $$\frac{TiO_2}{Sb_2O_5}$$

which may be conveniently termed the "titanium-antimony" ratio; and (2) the molecular ratio $$\left(\frac{A}{B}\right)$$

of the acid components to the basic component, $$\frac{Sb_2O_5+TiO_2}{CaO}$$

which may conveniently be called the "basicity ratio" and which is an index of the degree of basicity (or acidity) of the final opacifier composition. It is to be noted that as the numerical value of the "basicity ratio"

$$\frac{B}{A}$$

increases, the actual chemical basicity of the opacifier product decreases.

In addition to correlating the values of the two ratios aforesaid, thereby controlling the power of the mill addition opacifier to impart to fired enamel the proper degree of opacity or light reflectance, it is also important to maintain the molar proportion of the antimony pentoxide in the opacifier within definite limits in order to ensure that the fired enamel may have the proper color (quality or whiteness) as distinguished from opacity. Too large a proportion of antimony pentoxide in the calcined opacifier product tends to impart a yellowish tinge to the fired enamel, which unsuits it for use in producing high grade white enamel, although such tinge is unobjectionable if the opacifier is to be used for producing colored enamels. Too small a proportion of antimony pentoxide, on the other hand, will result in insufficient opacity of the enamel. Also, the accompanying increase in molar proportion of titanium oxide content, if excessive, may tend to cause the fired enamel to have a somewhat matte surface instead of the desired high gloss.

The invention is further based upon the discovery that if, instead of calcining a mixture of the three essential oxides or compounds yielding them, a calcium titanate and a calcium antimonate are first separately prepared, and a mixture of the calcium titanate and calcium antimonate proportioned to give the aforesaid ratio correlation is then calcined, certain technical advantages result that are of substantial importance in the commercial manufacture of opacifiers of this type. For example, because each of the components, calcium titanate and calcium antimonate, is prepared and calcined at the optimum temperature for the formation of such component, the operation of calcining the mixture of these pre-formed compounds involves only a comparatively small part of the total reaction or reactions required to produce the final opacifier product. This promotes greater uniformity of the product. One of the objections to the previously known methods has been that considerable difficulty was encountered in obtaining uniformity of the opacifier products. The advantages of the novel procedure are also realized in large measure where some free or uncombined calcium oxide, or titanium oxide, or both, is incorporated in the mix, along with the pre-formed calcium antimonate and calcium titanate. This modified procedure is desirable in some circumstances, as will more fully hereinafter appear.

The terms "reflectance" and "opacity" are used more or less interchangeably in the enamel industry. Reflectance is the ratio between the light reflected from a test specimen of enamel and the light received by the specimen. The reflectance of a freshly prepared magnesium oxide surface is taken as 100% and all values for reflectance are referred to this primary standard. Opacity is the reflectance for daylight illumination. Actually, in determining the reflectance values of test specimens by the method hereinafter more fully explained, the primary standard is not used. Instead, the reflectance values of enamel plaques prepared with the aid of the opacifiers to be tested are measured by means of a reflectometer with direct reference to a secondary standard, namely, an enamel plaque prepared at the same time and under exactly the same conditions as the other plaques but with tin oxide as the mill addition opacifier. The difference in reflectance value (R-diff) between each of the other plaques and the tin oxide plaque is obtained in per cent of the ideal 100 per-cent reflectance of the primary (MgO) standard. In the reflectance data given hereinafter, the figures for "R-diff" are preceded by a plus sign where the test plaque has a higher reflectance than the tin oxide standard; otherwise the figures indicate a lower reflectance than the tin oxide standard.

"Color," which is to be distinguished from opacity, may be described in the case of a white enamel by such terms as "blue white," "cream white," etc., or by reflectance values for light of different wave lengths. A specimen is white when it has equal reflectance for all wave lengths of light. A blue white specimen has a high reflectance in the blue end of the spectrum and a low reflectance in the red. With a cream white or yellow white specimen, these relative reflectance values are reversed. The color ratings hereinafter mentioned are determined by visual comparison of each enamel specimen with a series of standards varying in color from the white obtained by the use of tin oxide as opacifier to a light yellow or cream tinge. These color standards are arbitrarily graded from A to N. On this scale, A corresponds to the best or highest grade of blue white obtainable with tin oxide; while B to F represents progressive departure in small increments from the blue white of A in the direction of the blue-green portion of the spectrum, but are nevertheless sufficiently high grades of white to be acceptable for many purposes in production of white porcelain enamel. Grades G to N represent further departures through blue-green in the direction of yellow, with a cream as the deepest shade. These grades G to N, while generally not acceptable in the manufacture of high grade white enamel ware, are very useful in manufacture of colored enamel ware, being especially valuable for that purpose because of the fact that their opacity ratings are so high, remarkably so in many cases.

In producing enamels of the highest grade, the substitute mill addition opacifier used should most desirably be such as to give the enamel a reflectance not more than one (1) point or per cent lower reflectance or opacity than would be given it by tin oxide. The present invention makes it possible for the first time in commercial practice to consistently attain this objective, and to attain even much higher standards, in opacifiers of the 3-oxide type that vary widely in specific composition among themselves. Opacifiers having somewhat lower reflectance value or rating, such as two (2) or even three (3) points or per cent lower than tin oxide, are also acceptable to a considerable extent for use in producing a substantial proportion of relatively high grade enamel ware; but a differential reflectance of 3 per cent below the tin oxide standard is practically the lower limit of acceptability, although it has been difficult heretofore, particularly in the field of white vitreous or porcelain enameling, to meet even this lower limit of acceptability for substitute opacifiers with a satisfactory degree of regularity or dependability. Such lower limit is easily met with certainty, by following the principles of the present invention, in a still wider range of opacifier compositions which are nevertheless also definitely distinguishable from previously proposed opacifiers comprising a combination of the oxides of calcium, antimony and titanium. It is to be understood that opacifiers whose reflectance rating is substantially lower than 3 per cent below that of tin oxide are outside the scope of the present invention.

It is evident that the present invention opens up a new and relatively broad yet well defined field heretofore quite unknown to the art, and at the same time enables the manufacture of such opacifiers to be conducted on a basis that is rational rather than empirical.

Figure 1:
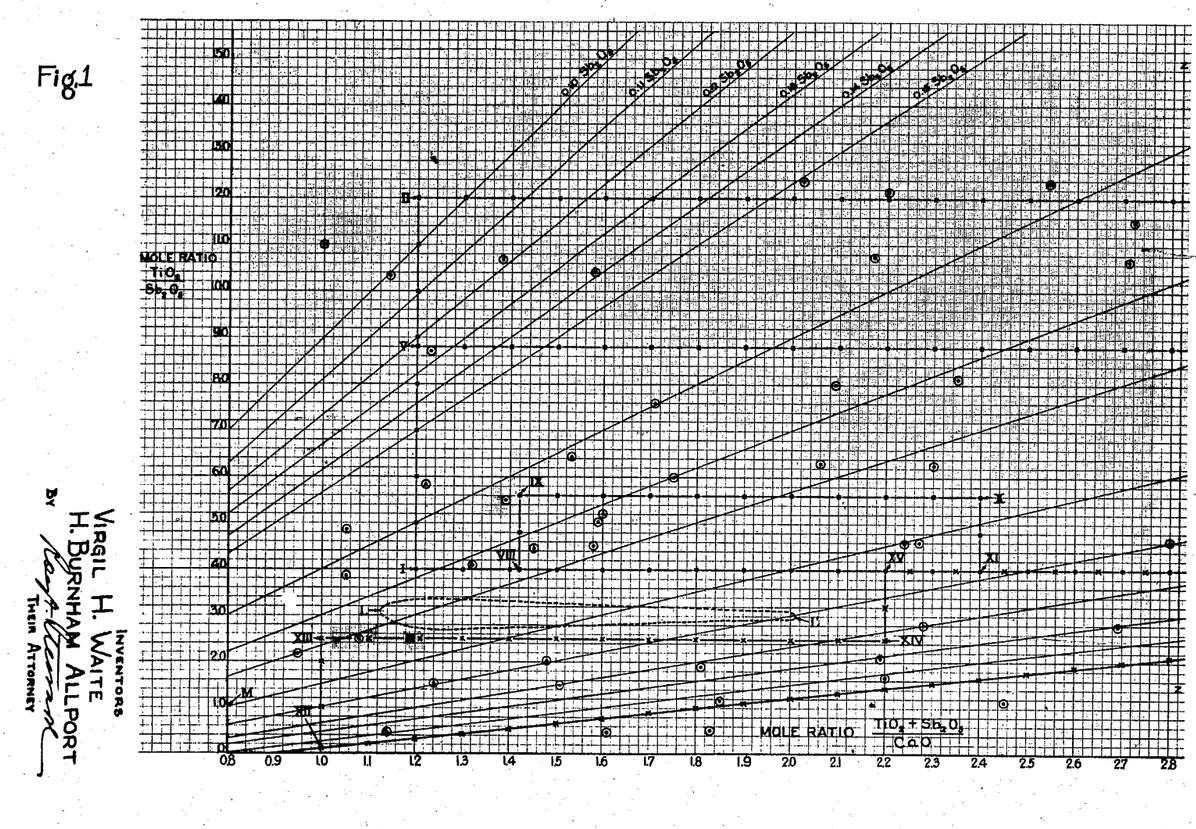
Figure 1A:
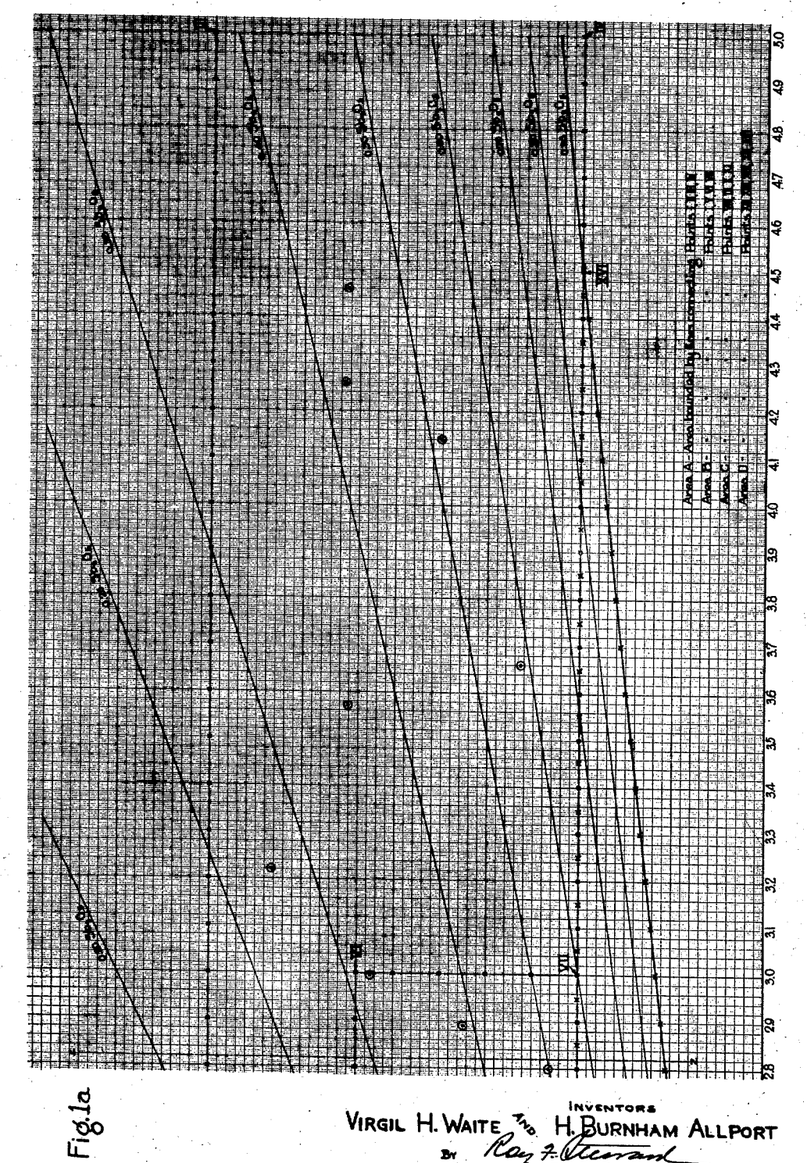

The manner in which the titanium oxide-antimony oxide ratio and the basicity ratio are coordinated or correlated and may be varied in accordance with the principles of the invention is indicated in the accompanying drawings wherein Figs. 1 and 1a, placed end to end and in registry on the line Z—Z, present a graph showing the essential compositional characteristics of typical opacifying agents produced in accordance with the principles of the invention. On this graph are plotted in rectangular coordinates the correlated values of the aforesaid titanium-antimony ratio and the basicity ratio, these being molar ratios as hereinabove explained. The numerical values of the titanium-antimony ratio are indicated by the ordinates, and those of the basicity ratio by the abscissas. Each of the straight oblique lines also shown on the graph represents a specified constant molar proportion or content of antimony pentoxide (assuming the molar proportion of calcium oxide to be 1.0) which is indicated at its extremity remote from the Y axis. All opacifier compositions on the graph having that particular molar proportion of antimony pentoxide are to be found on that oblique line. Such oblique lines are here shown for a number of constant molar proportions of antimony pentoxide, as follows: 0.10, 0.11, 0.12, 0.13, 0.14, 0.15, 0.20, 0.25, 0.30, 0.40, 0.50, 0.60, 0.70, 0.80, 0.90. The correct position of each of these oblique lines on the graph, as well as that for any other constant molar proportion of antimony pentoxide, is readily found by a simple calculation from the correlated titanium-antimony and basicity ratios.

The process of manufacturing mill addition opacifiers in accordance with the principles herein disclosed is believed to be broadly novel in the art. Also, as has already been pointed out, the invention opens up a wide field of novel mill addition opacifier compositions of great value. Certain areas indicated on the accompanying graph define that field of novelty and, incidentally, define important conditions characterizing the process in its most desirable practical embodiments. The areas just referred to are those enclosed or bounded by lines connecting certain points, as follows:

Area A: Points I, II, III, IV.
Area B: Points I, V, VI, VII.
Area C: Points VIII, IX, X, XI.
Area D: Points XII, XIII, XIV, XV, XVI.

The location of these points on the graph by their rectangular coordinates is shown in the following table:

| Point No. | (X) $\frac{TiO_2+Sb_2O_5}{CaO}$ | (Y) $\frac{TiO_2}{Sb_2O_5}$ |
|---|---|---|
| I | 1.2 | 4.0 |
| II | 1.2 | 12.0 |
| III | 5.0 | 12.0 |
| IV | 5.0 | 4.0 |
| V | 1.2 | 8.8 |
| VI | 3.0 | 8.8 |
| VII | 3.0 | 4.0 |
| VIII | 1.42 | 4.0 |
| IX | 1.42 | 5.6 |
| X | 2.4 | 5.6 |
| XI | 2.4 | 4.0 |
| XII | 1.0 | 0.1 |
| XIII | 1.0 | 2.5 |
| XIV | 2.2 | 2.5 |
| XV | 2.2 | 4.0 |
| XVI | 4.5 | 4.0 |

Broadly, therefore, the invention, insofar as concerns compositions of matter, comprises Area A plus Area D; that is, the total area enclosed by lines connecting points I, II, III, IV, XVI, XII, XIII, XIV, XV and I, in the order stated.

*Area A.*—Within the confines of this area, opacifiers prepared in accordance with the invention virtually always rate, by the specimen enamel R-diff test, not more than about 3 points or per cent below the tin oxide standard as a minimum; and, with inclusion of suitable proportions of calcium fluoride or equivalent fluoride in the calcination where necessary, they yield white enamels within the grade range of A to F. This area lies almost wholly between oblique lines indicating constant antimony pentoxide molar proportioning of 0.10 and 0.90, respectively, and the higher color grades occur in that portion of the area representing an antimony pentoxide molar proportion of below 0.50. Beyond the maximum value (5.0) shown on the graph for the basicity value, it is difficult or impractical to consistently produce opacifiers having satisfactory characteristics.

*Area B.*—This smaller area, included within Area A, and lying between constant molar antimony pentoxide lines 0.12 and 0.60, and within the indicated ranges for the titanium-antimony and basicity ratios, comprises novel opacifier compositions practically all of which have an opacifying rating equal to or greater than that of tin oxide by the standard reflectance test. Area B is therefore a particularly desirable portion of the field covered by the broad invention.

*Area C.*—This still smaller area, having the indicated ranges of titanium-antimony and basicity ratios, and lying mainly between constant molar antimony pentoxide lines 0.25 and 0.40, represents optimum practice within the invention.

*Area D.*—As will be seen, this irregularly shaped area lies below Area A and part of its upper boundary line, XV—XVI, coincides with part of the lower boundary I—IV of Area A. The lower boundary of Area D, XII—XVI, lies on the oblique line representing a constant antimony pentoxide molar proportion of 0.90. Most of the novel opacifier compositions within this Area D, although they have opacity or reflectance ratings only slightly below that for tin oxide, give enamels within the color grade range of G or H to N. It is impractical to improve this color grade sufficiently to render the opacifier compositions in this area suitable for use in producing white enamel ware, because the proportion of calcium fluoride necessary to use in the calcination mix to effect such color improvement would in most cases too greatly reduce the opacity or reflectance rating. These compositions can be very satisfactorily employed, however, in the production of colored enamels.

For the sake of convenient reference, there are also indicated on the graph the small elongated area L—L' shown in dotted line, and the point M, which represent such of the hereinabove mentioned previously proposed opacifier compositions of the general 3-oxide type as are not otherwise excluded from consideration as prior art. The extremities of the aforesaid dotted line area are at L ($x=1.12$, $y+3.10$) and L' ($x=2.01$, $y=3.00$); and at its widest part (approximately at $x=1.25$) it extends from $y=2.80$ to $y=3.36$.

Where opacifiers are to be made that are to be used as mill addition agents in producing the better grades of white enamel, it is advisable, in order more certainly to ensure that the enamel produced with the aid of the resultant opacifier will have the desired degree of whiteness and freedom from objectionable yellowish tinge, to incorporate in the calcination mix calcium fluoride or an equivalent proportion of some other suitable fluoride, in amount equivalent to from 1 to 10 per cent of the combined weight of the three essential oxide components. However, since all or nearly all of the calcium fluoride so added to the mix goes through the calcining operation apparently without change and remains as such in the resultant finished opacifier product, it is unnecessary to take the calcium fluoride addition into account in calculating the basicity ratio of the calcination mix and the final opacifier. Where calcium fluoride is employed, the mix thus still consists essentially of the oxides of calcium, antimony and titanium for the purposes of the invention.

It has also been found that, in order to obtain calcined opacifier products giving the highest degree of satisfaction and dependability in use as mill additions, it is important, generally speaking, that they be as free as possible from soluble constituents such as free base or alkaline material, particularly oxides of sodium and potassium. Even a very small quantity of soluble component in the opacifier addition agent may sometimes cause the enamel slip to "set up" when the slip is being prepared in the mill. This "set-up" effect due to the presence of a small amount of soluble alkaline material is especially noticeable in the milling of enamels containing acid resistant frits. Set-up difficulties have been encountered in the attempted commercial use of mill addition opacifiers of the 3-oxide type heretofore proposed.

Accordingly, the practice of the present invention most desirably includes subjecting the calcined opacifier product to a further treatment designed to eliminate or reduce to a negligible minimum any residual content of soluble base or alkaline material that may be present either due to impurity of any of the oxides employed in the initial mix or resulting from the calcining reaction or from its not being perfectly complete. Although frequently of advantage, this further treatment is to be understood as in no sense indispensable in the practice of the invention, but only optional. When employed, this further treating step consists in subjecting the calcined opacifier product to a thorough washing with water, this washing being accomplished most effectively and expeditiously when the water contains a small percentage of a suitable acid, such as acetic, hydrochloric or nitric.

In view of the foregoing, it is obvious that inclusion in the initial mix of any salt of either sodium or potassium is undesirable in the practice of the invention, since this would result in increasing the proportion of residual soluble basic or alkaline material requiring removal from the calcined opacifier product.

Some of the prior art literature relating to opacifier addition agents of the 3-oxide type teaches that satisfactory opacifier products for use in producing white enamel ware are obtainable when certain other oxides are substituted for calcium oxide and titanium oxide, respectively. For example, it is suggested that zinc oxide or magnesium oxide, as well as a certain proportion of an alkali metal oxide, may be substituted for calcium oxide, and that zirconium oxide may be substituted for titanium oxide. From the investigations of the present applicants, however, it appears that such teaching is erroneous and misleading, and that opacifier agents constituting actually satisfactory substitutes for tin oxide in the mill in producing white enamel slips are not actually obtainable when such substitutes are used. It is accordingly to be understood that, for the purposes of the present invention, the oxides of calcium, antimony and titanium are the essential components and that other oxides are not equivalent to and may not be substituted for any of them, as has been heretofore suggested.

In commercially manufacturing opacifier compositions in accordance with the principles of the invention, the separately pre-formed calcium antimonate and calcium titanate may be so prepared as to correspond, respectively, to the formulae $CaO.Sb_2O_5$ and $CaO.TiO_2$, neither compound containing any substantial amount of a free oxide. Calcining a mixture of the antimonate and titanate in proper proportions yields a satisfactory opacifier product. It is to be noted, however, that in this case, whatever may be the proportioning of the antimonate and titanate in the mixture to be calcined, the aforesaid basicity ratio is always equal to 1.0 regardless of what the titanium-antimony ratio may be. It is therefore evident that, in this special case, it is possible to produce opacifier products in only a relatively small part of the large compositional area shown on the graph in the drawing as representing the scope of the present invention.

This practical limitation can be readily avoided wherever desired by so proportioning the component ingredients in the separate preparation of the antimonate and titanate that either or both of the resultant compounds shall contain some free oxide. Since it is often desirable that the final opacifier product shall contain no or relatively little free base, and since it is also desirable that the untreated product resulting from the mixture of antimonate and titanate shall contain little or no free base to be leached out in the optional treatment with dilute acid referred to hereinabove, it is advantageous as a practical matter to so prepare the antimonate and titanate that neither shall contain any free or uncombined calcium oxide. But, in order to prevent loss of antimony during preparation of the antimonate, it is necessary to have at least as much calcium oxide present as will suffice to completely bind all the antimony pentoxide; so that for practical reasons the separately produced antimonate should desirably be substantially free of both free calcium oxide and free antimony oxide. Consequently, in the best way of practicing the invention, it is the calcium titanate which most desirably contains the free or uncombined oxide necessary to avoid the aforesaid compositional limitation inherent in the use of a calcination mix composed of calcium antimonate and calcium titanate both free of uncombined oxide. In practice, therefore, the calcium titanate is most desirably so prepared as to contain some uncombined titanium oxide.

It is found that if a mixture of calcium oxide and titanium oxide, containing less than enough calcium oxide to combine with all the titanium oxide, is heated under oxidizing conditions at reacting temperatures, the resultant calcium titanate usually contains both free calcium oxide and free titanium oxide in proportions varying with the proportioning of the original mix. Since it is usually desirable, as above explained, to have no free calcium oxide present in the calcium titanate product, precautions are taken in the best mode of practicing the invention, to prevent this. It has been found that if a small percentage (e. g. 1%) of a fluoride, most desirably calcium fluoride, is included in the initial mixture of calcium oxide and titanium oxide, the resultant calcium titanate product, formation of which the added calcium fluoride appears to promote, contains some free titanium oxide but substantially no free calcium oxide. Mixes of this calcium titanate product (containing free titanium oxide) with calcium antimonate, can be prepared in which the basicity ratio, as well as the titanium-antimony ratio, may vary widely, thus enabling the manufacture of satisfactory mill addition opacifiers over the entire area shown on the graph as included within the invention.

It is of course also permissible within the scope of the broad invention to separately prepare calcium antimonate and calcium titanate, both free of any uncombined oxide, and then to add to a mixture of these compounds one or more of the three component oxides in free or uncombined condition. Thus, in a typical example, the calcination mix may comprise preformed calcium antimonate free from uncombined oxide and preformed calcium titanate free from uncombined oxide, together with a suitable proportion, usually a small proportion, of titanium oxide added as such. This likewise permits wide variation of the basicity ratio.

For best results in practicing the invention, it is desirable to include in the antimonate-titanate mix that is to be calcined a suitable fluoride such as calcium fluoride added as such, whether or not the mix contains a free oxide, and whether or not a small amount of a fluoride has been employed in the mix from which the calcium titanate was separately prepared as above described. Such addition of fluoride to the antimonate-titanate calcination mix has the effect of favoring maximum whiteness of the fired enamel produced with the aid of the hereindescribed mill addition opacifiers.

In order to afford a still fuller understanding of the principles of the invention, typical examples of how it may be carried out in practice will now be given by way of illustration.

*Example 1*

In this case, a mill addition opacifier is prepared by calcining a mixture of calcium antimonate free of combined oxide with the calcium titanate containing some free titanium oxide but no free calcium oxide; and it is desired to obtain a final opacifier product having a predetermined desired relationship or coordination of its titanium-antimony ratio and its basicity ratio.

More specifically, the calcium titanate is to be prepared from a mixture comprising only one-half mol calcium oxide to one mol of titanium oxide.

As already explained, any calcium fluoride that is to be included in the antimonate-titanate calcination mix may be neglected in calculating the basicity ratio. Said mix therefore consists essentially of (CaO) (Sb$_2$O$_5$) and (0.5CaO) (TiO$_2$); and it is to be proportioned to give, in the final opacifier product, a titanium-antimony ratio of about 4.5, and a basicity ratio of about 1.6.

The calcium titanate may be prepared by dry mixing

| | Pounds |
|---|---|
| Titanium oxide | 100 |
| Whiting | 62.5 |
| Calcium fluoride | 1.6 | for thirty minutes in a suitable mixture, and calcining the dry mix at about 950° C. (1740° F.). Any mixing apparatus capable of giving a thoroughly homogeneous mixture of the ingredients may be employed such, for example, as a Simpson intensive mixer, of the type illustrated in U. S. patent to Simpson No. 2,226,023. The calcination may be carried out in a continuous kiln in which saggers containing the dry mix are passed through a pre-heat zone, a firing zone, and a cooling zone. In a typical instance, it requires nine hours for the saggers to pass through these three zones and they are in the high temperature firing zone (950° C.) for approximately 2½ hours.

Calcium antimonate may be prepared by mixing a solution of calcium nitrate containing suspended calcium carbonate with antimony oxide, and evaporating to semi-dryness. The reagents are employed in the following proportions:

| | | |
|---|---|---|
| Whiting | pounds | 360 |
| Nitric acid (36° Bé.) | do | 560 |
| Water | gallons | 20 |
| Antimony trioxide | pounds | 1050 |

This gives substantially equi-molecular proportions of calcium oxide and antimony oxide.

The partially dried mix is charged into a reverberatory hearth furnace operating at 900° C., where it is heated for two hours with rabbling at 15-minute intervals.

The calcium antimonate and calcium titanate having been separately prepared as above described, a porcelain lined ball mill fitted with porcelain balls is charged with

| | | |
|---|---|---|
| Calcium titanate (0.5 CaO) (TiO$_2$), pounds | | 640 |
| Calcium antimonate (CaO) (Sb$_2$O$_5$) | do | 500 |
| Fluorspar | do | 70 |
| Water | gallons | 160 |

The charge is milled for a sufficient length of time, say four hours, to ensure the requisite fine grinding and uniformity of the mix; after which the slurry is pumped through a filter press and the filter press cakes dried. The filter cakes are then disintegrated, as by treatment in the Simpson mixer above mentioned, and then charged into clay saggers.

The saggers are passed through a continuous kiln of the type above referred to. In this kiln, the saggers containing the mix to be calcined are passed through a pre-heat zone, a firing zone, and a cooling zone, the temperature in the firing zone being maintained at 1100° C. In a typical instance, a 16-hour cycle is employed in this calcination for passage of the saggers through the three zones, the saggers being in the firing zone for approximately 4.5 hours. It takes about 4.5 hours for the saggers to pass through the pre-heat zone, the final temperature attained therein by the material being approximately 1100° C. Passage through the cooling zone takes about 7 hours, the final temperature of the material being ordinarily on the order of 80–100° C.

While the 16-hour time cycle, sub-divided as indicated, and a maximum firing zone temperature of 1100° C., have been found in actual practice to be operating conditions especially well adapted to ensure effectiveness of the calcining operation in yielding a high grade opacifier product of the character herein described, it is to be understood that these operating conditions can be varied considerably within the scope of the invention and that they merely represent what is at present regarded as optimum practice. For instance, it is feasible to employ a substantially higher firing zone temperature up to a maximum of approximately 1200° C. or thereabouts, in which case the time that the material to be calcined remains in the firing zone may be substantially shortened. It is desirable, however, that the calcination shall not be at a temperature sufficiently high or for a period of time sufficiently long to effect more than incipient sintering, at the most, of the opacifier mix. There may be some clumping of the material together, but the final calcined product should be so friable that it can be crushed between the fingers. On the other hand, the calcining temperature must be high enough to cause the desired reaction between the component oxides to occur with sufficient completeness. At temperatures below 1000° C., the desired reactions proceed too slowly for practical purposes.

If the calcined material is to be washed, as is often desirable, it is discharged from the kiln into washing tanks in which it is first washed with dilute acid, and finally with water. If the acid used in the washing operation is acetic, a 1% concentration is satisfactory. If hydrochloric or nitric acid is used, a smaller percentage giving the wash water a pH about equal to that of 1% acetic acid should be used.

After washing and drying, the material is finely ground in a hammer mill, whereupon it is ready for use.

Analysis of the final opacifier product shows, in a typical instance, a titanium-antimony ratio of 4.54 and a basicity of 1.58. These very closely approximate the ratios aimed at. Employment of the product as the mill addition opacifier in producing white vitreous enamel, the resultant enamel is of excellent whiteness, and commonly shows, by the standard reflectance test, an even higher opacity than enamel identical except for the use of tin oxide as the mill addition opacifier. In a typical instance, R-diff is +1.0 to +2.0, with an A color.

*Example 2*

In this case the mix consists of:

| | Parts by weight |
|---|---|
| $CaO.Sb_2O_5$ | 740 |
| $CaO.TiO_2$ | 795 |
| $TiO_2$ | 467 |
| $CaF_2$ | 120 | and after calcining, etc., as described under Example 1, the product has a $TiO_2/Sb_2O_5$ ratio of 6.0 and a basicity ratio of about 1.75. When the product is employed as a mill addition opacifier the resultant enamel shows a reflectance at least equal to that of the tin oxide standard (i. e. R-diff approximates 0.0) and grade A color.

*Example 3*

In this case the mix consists of:

| | Parts by weight |
|---|---|
| $CaO.Sb_2O_5$ | 370 |
| $0.5\ CaO.TiO_2$ | 630 |
| $CaF_2$ | 40 | and the final product has a titanium-antimony ratio of 6.0 and a basicity ratio of 1.75. The product when employed as a mill addition opacifier results in an enamel having a reflectance slightly higher than when tin oxide is employed as opacifier in an identical enamel, or slightly better than R-diff 0.0, and grade A color.

The points on the accompanying graph corresponding to the opacifiers obtained in the foregoing examples are respectively indicated by dots, each within a circle.

The apparent density of opacifiers prepared in accordance with the invention varies somewhat with their specific composition and the particular operating conditions characterizing their manufacture, but in typical instances may vary from about 7.5 to 8.1 grams per cubic inch. In color, they are ordinarily somewhat off the pure white, having a slightly yellowish or cream hue.

In order to illustrate further the scope and boundaries of the invention, the locations of a number of other enamel opacifiers that can be manufactured in accordance with the invention are plotted on the accompanying graph and are identified by such location in the following table. This table also gives the R-diff of the test enamel specimens for each such opacifier, and in many instances the color grade also. With respect to the color grade, it should be noted here that in those instances where the color grade is indicated to be lower than A, the final mixture prior to calcination did not include calcium fluoride or at least not enough to materially raise the color grade. In most such instances the color grade could be raised considerably, frequently to as high as A or B, by incorporating a suitable proportion of calcium fluoride in the calcination mix within the percentage range hereinabove recommended. In general, this would tend to lower the reflectance value somewhat but ordinarily not more than 0.5 to 1.0 unit or per cent. It will be understood that, from the data afforded by the location of these opacifiers on the graph and by the subjoined table, they can be manufactured in accordance with the principles of the invention herein disclosed. The opacifiers for which the test enamel colors are indicated as of lower grade than A are prepared from calcination mixes not containing calcium fluoride.

| | A/B | $TiO_2/Sb_2O_5$ | R-diff | Color |
|---|---|---|---|---|
| Area A (outside of B and C) | 1.38 | 10.68 | 1.6 | B |
| | 2.17 | 10.76 | 2.9 | C |
| | 2.71 | 10.68 | 2.2 | C |
| | 3.22 | 10.67 | 1.8 | E |
| | 3.57 | 9.04 | 2.1 | N |
| | 3.66 | 5.11 | 2.5 | N |
| | 2.72 | 11.52 | 3.0 | C |
| | 4.26 | 9.14 | 2.3 | |
| | 4.46 | 9.08 | 2.8 | |
| | 4.14 | 7.04 | 2.2 | |
| Area B (outside of C) | 1.58 | 10.4 | 0.6 | B |
| | 1.53 | 6.44 | +1.1 | D |
| | 1.71 | 7.59 | +1.3 | C |
| | 2.09 | 8.02 | +0.6 | D |
| | 2.06 | 6.34 | +1.1 | E |
| | 2.89 | 6.50 | +1.8 | G |
| | 1.23 | 8.72 | +0.1 | |
| | 1.22 | 5.84 | +0.2 | |
| | 1.32 | 4.08 | +1.0 | |
| | 1.39 | 5.54 | +0.3 | |
| | 2.35 | 8.12 | +1.0 | D |
| | 3.0 | 8.5 | +1.8 | D |
| | 2.3 | 6.3 | +1.8 | F |
| | 2.8 | 4.6 | +0.5 | F |
| Area C | 1.45 | 4.45 | +2.0 | |
| | 1.59 | 5.04 | +2.4 | E |
| | 2.27 | 4.58 | +2.0 | J |
| | 2.24 | 4.58 | +1.6 | L |
| | 1.6 | 5.2 | +2.2 | E |
| Area D | 2.20 | 1.67 | 0.8 | M |
| | 1.81 | 1.90 | 0.7 | N |
| | 1.50 | 1.48 | 0.3 | K |
| | 1.24 | 1.56 | 0.6 | H |
| | 1.48 | 2.03 | 0.2 | I |
| | 1.08 | 2.46 | 1.0 | |
| | 1.19 | 2.44 | 0.3 | |
| | 1.14 | 0.46 | 2.6 | |
| | 1.85 | 1.16 | 2.2 | |
| | 2.19 | 2.08 | 0.4 | N |
| | 2.28 | 2.80 | 0.9 | J |
| | 2.69 | 2.76 | 3.2 | |

Compositions outside but rather closely adjacent to the boundaries of the total area shown on the graph as representing the scope of the present invention, are found to be markedly inferior in opacifying power to the opacifiers of the present invention, their R-diff values being quite consistently much more than 3 points or per cent below the tin oxide opacifier reflectance standard. A number of such compositions outside the invention have been plotted on the accompanying graph. Their location data, together with their R-diff values, are given in the following table:

| A/B | $TiO_2/Sb_2O_5$ | R-diff |
|---|---|---|
| 0.95 | 2.16 | 4.9 |
| 1.05 | 3.84 | 5.0 |
| 1.05 | 4.88 | 5.6 |
| 1.14 | 10.32 | 4.0 |
| 1.00 | 11.00 | 8.1 |
| 2.02 | 12.38 | 4.5 |
| 2.20 | 12.16 | 4.6 |
| 2.54 | 12.32 | 4.2 |
| 1.61 | 0.48 | 7.6 |
| 1.83 | 0.52 | 7.7 |
| 2.45 | 1.14 | 6.4 |

A description will now be given of the standard method of preparing enamel specimens with the aid of mill addition opacifiers manufactured in accordance with the invention and testing the same against an enamel specimen prepared in exactly the same manner but employing tin oxide as the mill addition opacifier. For each of the opacifiers to be tested, and for the tin oxide opacifier standard, an enamel slip is prepared by wet milling the following mixture:

|  | Parts by weight |
|---|---|
| Enamel frit | 500 |
| Vallender clay | 25 |
| Opacifier | 20 |
| Water | 200 |

The enamel frit used has been pre-sized and only that portion passing 8 mesh and retained on 50 mesh is charged. This is to facilitate uniformity of grinding. For each opacifier to be tested, a separate mill is used in preparing the corresponding slips, and another mill is used for the slip in which tin oxide is the opacifier. Grinding is carried out in porcelain pebble mills (Paul O. Abbe bacilli size) for 12 hours at which time all of the mixtures are ground to practically the same fineness as represented by a residue of 0.5 to 3.0 grams on a 325 mesh screen from samples containing 100 grams frit.

The ground enamel slip is applied to 4″ x 6″ ground coated plaques in two coats to give a total fired weight of cover enamel equivalent to 93 grams per square foot. Each coat is fired 2½ minutes at 1540° F. in an electric muffle furnace.

The reflectance values of the fired enamel plaques, including that employing the tin oxide opacifier, are measured on the Hunter multipurpose reflectometer (Research Paper RP 1345—National Bureau of Standards) and, for each opacifier, the difference (R-diff) between the reflectance value of the corresponding plaque and that of the tin oxide plaque (R tin oxide—R opacifier) is calculated. By running a mill containing tin oxide in each test and taking the difference in opacity as noted above, unavoidable variations in different lots of enamel frit, manipulation, etc., are largely eliminated. According to the system of notation used herein, difference values (R-diff) preceded by a plus sign (+) indicate that the reflectance of the opacifier is greater than that of tin oxide, while difference values without a prefix indicate that reflectance values are less than for tin oxide.

It should be pointed out that, before measuring the reflectance values as above described, the reflectometer is first carefully calibrated by means of a standard plaque, one of a series of standard porcelain and enamel plaques, known as "NBS IX-4," made and furnished by the National Bureau of Standards for use in calibrating the Hunter reflectometer. These plaques have been carefully calibrated at the Bureau of Standards against the primary magnesium oxide surface rated at 100% reflectance, and each plaque is marked with its proper reflectance value, as found by the Bureau of Standards, in per cent of the primary standard (MgO) reflectance value. The reflectance data given herein were obtained after calibrating the Hunter reflectometer with No. 51 of the aforesaid series of standard plaques, this plaque having a value of 71.4%, or only slightly below the reflectance value normally shown by a test tin oxide enamel plaque.

The enamel specimen which contains tin oxide as the mill addition opacifier usually has a reflectance value of substantially 75.7%. The aforesaid difference values (R-diff), above or below the reflectance value of the tin oxide standard enamel therefore represent percentages of the assumed perfect light reflectance of the ultimate or basic standard, i. e. the standard magnesium oxide surface.

This application contains subject matter included also in companion application Ser. No. 446,976, filed June 13, 1942, by the same applicants.

What is claimed is:

1. The process of manufacturing compositions useful as mill addition opacifier agents in the production of vitreous or porcelain enamels, which comprises calcining materials consisting preponderantly of intimately commingled calcium antimonate and calcium titanate in finely divided condition, the components being so proportioned in the mix as to give a calcined product having a composition characterized by a predetermined correlation between the numerical values of the basicity ratio $$\left(\frac{TiO_2+Sb_2O_5}{CaO}\right)$$

and the titanium-antimony ratio $$\left(\frac{TiO_2}{Sb_2O_5}\right)$$

respectively, said numerical values lying within the total area represented by Area A plus Area D on the accompanying graph hereinbefore described, and by a molar proportion of antimony pentoxide within the range 0.10 and 0.90 when the molar proportion of calcium oxide is taken as 1.0.

2. The process defined by claim 1, wherein said calcined product is washed to remove soluble base or alkaline material.

3. The process defined by claim 1 wherein the calcination mix includes, in free or uncombined condition, at least one of the oxide components (calcium oxide, titanium oxide) of calcium titanate, and the components of the mix are so proportioned as to give a final calcined product in which the numerical value of the basicity ratio lies between the approximate limits 1.2 and 5.0, and that of the titanium-antimony ratio between the approximate limits 4.0 and 12.0.

4. The process defined by claim 1, wherein the calcination mix includes uncombined titanium oxide, and the components of the mix are so proportioned as to give a final calcination product in which the numerical value of the basicity ratio lies between the approximate limits 1.2 and 3.0, and that of the titanium-antimony ratio between the approximate limits 4.0 and 8.8, while the molar proportion of antimony pentoxide lies between the approximate limits 0.12 and 0.60.

5. The process defined by claim 1, wherein the calcination mix includes uncombined titanium oxide, and the components of the mix are so proportioned as to give a final calcination product in which the numerical value of the basicity ratio lies between the approximate limits 1.42 and 2.4, and that of the titanium-antimony ratio between the approximate limits 4.0 and 5.6, while the molar proportion of antimony pentoxide lies between the approximate limits 0.25 and 0.40.

6. The process defined by claim 1 wherein the calcination mix includes, in free or uncombined condition, at least one of the oxide components (calcium oxide, titanium oxide) of calcium titanate, and the components of the mix are so proportioned as to give a final product in which the numerical values of the correlated basicity and titanium-antimony ratios, as well as the molar proportion of antimony pentoxide, lie within Area D as shown on the accompanying graph and hereinbefore described.

7. The process set forth in claim 1, further characterized by the fact that from 1 to 10 per cent of calcium fluoride, based on the combined weight of said components is incorporated in the mix prior to calcination thereof.

8. A mill addition opacifier useful in preparing vitreous or porcelain enamels, consisting of the product of calcining an intimate mixture containing predominantly calcium titanate and calcium antimonate at reacting temperature insufficiently high to smelt the mixture, said mixture being so proportioned that, in the calcined product, the basicity ratio $$\left(\frac{TiO_2 + Sb_2O_5}{CaO}\right)$$

and the titanium-antimony ratio $$\left(\frac{TiO_2}{Sb_2O_5}\right)$$

have numerical values which lie within the total area represented by Area A plus Area D on the accompanying graph hereinbefore described, and which bear a predetermined relation to one another, and the molar proportion of antimony pentoxide is not less than 0.10 nor more than 0.90 when the molar proportion of calcium oxide is taken as 1.0; enamel produced with such opacifier under standard test conditions having a reflectance value not more than 3 per cent lower (R-diff) than an enamel produced under the same conditions except for the use of tin oxide as opacifier.

9. A mill addition opacifier as defined in claim 8, which is substantially free of soluble base or alkaline material.

10. A mill addition opacifier as defined in claim 8, characterized by the fact that the numerical value of its basicity ratio lies between the approximate limits 1.2 and 5.0, and that of its titanium-antimony ratio lies between the approximate limits 4.0 and 12.0.

11. A mill addition opacifier as defined in claim 8, characterized by the fact that the numerical value of its basicity ratio lies between the approximate limits 1.2 and 3.0, and that of its titanium-antimony ratio lies between the approximate limits 4.0 and 8.8, while its molar proportion of antimony pentoxide lies between the approximate limits 0.12 and 0.60; R-diff being not substantially more than 1.0 below the tin oxide standard.

12. A mill addition opacifier as defined in claim 8, characterized by the fact that the numerical value of its basicity ratio lies between the approximate limits 1.42 and 2.4, and that of its titanium-antimony ratio lies between the approximate limits 4.0 and 5.6, while the molar proportion of antimony pentoxide lies between the approximate limits 0.25 and 0.40; R-diff being above the tin oxide standard.

13. A mill addition opacifier as defined in claim 8, characterized by the fact that the numerical values of its basicity ratio and titanium-antimony ratio, respectively, as well as the molar proportion of antimony pentoxide, lie within Area D as shown on the accompanying graph and hereinbefore described.

14. The process of manufacturing compositions useful as mill addition opacifiers in the production of vitreous or porcelain enamels, which comprises preparing material comprising calcium titanate by calcining a mixture of titanium oxide and a compound providing available calcium oxide, separately preparing a material comprising calcium antimonate by calcining a mixture of antimony oxide with a compound providing available calcium oxide, thoroughly mixing the resultant calcination products and reducing the mixture to finely divided condition, and calcining the mixture at a temperature substantially higher that at which either component of the mixture was prepared but not high enough to cause substantial sintering of the mixture.

15. The process set forth in claim 13, wherein the first mentioned calcination mixture contains less than enough available calcium oxide to combine with all the titanium oxide, most desirably only about one-half mol calcium oxide to one mol of titanium oxide.

16. The process as set forth in each of claims 14 and 15, which includes incorporating in the calcination mix for the preparation of calcium titanate a small percentage of a fluoride, most desirably calcium fluoride.

17. The process of manufacturing compositions useful as mill addition opacifiers in the production of vitreous or porcelain enamels, which comprises (1) intimately dry mixing 100 parts of titanium oxide, 62.5 parts of whiting and 1.6 parts of calcium fluoride; calcining the dry mix under conditions such that it is exposed for approximately 2.5 hours to a maximum calcining temperature approximating 950° C.; (2) mixing 1050 parts of antimony trioxide with a solution of calcium nitrate containing suspended calcium carbonate, prepared by mixing 360 parts of whiting with 560 parts of nitric acid (36° Bé.) and 167 parts of water, evaporating the wet mix to semi-dryness, heating the partially dried mix in a reverberatory hearth furnace at around 900° C. for approximately two hours while rabbling at intervals; (3) intimately mixing 640 parts of the calcium titanate material resulting from operation (1) with 500 parts by weight of the calcium antimonate material resulting from operation (2), 70 parts of fluorspar and 1333 parts of water; then subjecting this mixture to prolonged milling to effect fine grinding and uniformity thereof, pumping the resultant slurry through a filter press, drying and disintegrating the filter press cakes of solid material, charging the material into saggers, passing the charged saggers through a continuous kiln having a pre-heat zone, a firing zone and a cooling zone, the temperature in the firing zone being maintained at approximately 1100° C. and the saggers remaining therein for approximately 4.5 hours, and fine grinding the calcined material, such grinding being optionally preceded by a washing treatment of the calcines first with weakly acidulated water and then with plain water, followed by drying; all parts hereinbefore specified being parts by weight and reasonably approximate.

18. The process defined by claim 1, wherein said calcined product is washed to remove soluble base or alkaline material, further characterized by the fact that from 1 to 10 per cent of calcium fluoride, based on the combined weight of said components is incorporated in the mix prior to calcination thereof.

19. The process defined by claim 1 wherein the calcination mix includes, in free or uncombined condition, at least one of the oxide components (calcium oxide, titanium oxide) of calcium titanate, and the components of the mix are so proportioned as to give a final calcined product in which the numerical value of the basicity ratio lies between the approximate limits 1.2 and 5.0, and that of the titanium-antimony ratio between the approximate limits 4.0 and 12.0, further characterized by the fact that from 1 to 10 per cent of calcium fluoride, based on the combined weight of said components is incorporated in the mix prior to calcination thereof.

20. The process defined by claim 1, wherein the calcination mix includes uncombined titanium oxide, and the components of the mix are so proportioned as to give a final calcination product in which the numerical value of the basicity ratio lies between the approximate limits 1.2 and 3.0, and that of the titanium-antimony ratio between the approximate limits 4.0 and 8.8, while the molar proportion of antimony pentoxide lies between the approximate limits 0.12 and 0.60, further characterized by the fact that from 1 to 10 per cent of calcium fluoride, based on the combined weight of said components is incorporated in the mix prior to calcination thereof.

21. The process defined by claim 1, wherein the calcination mix includes uncombined titanium oxide, and the components of the mix are so proportioned as to give a final calcination product in which the numerical value of the basicity ratio lies between the approximate limits 1.42 and 2.4, and that of the titanium-antimony ratio between the approximate limits 4.0 and 5.6, while the molar proportion of antimony pentoxide lies between the approximate limits 0.25 and 0.40, further characterized by the fact that from 1 to 10 per cent of calcium fluoride, based on the combined weight of said components is incorporated in the mix prior to calcination thereof.

22. The process defined by claim 1 wherein the calcination mix includes, in free or uncombined condition, at least one of the oxide components (calcium oxide, titanium oxide) of calcium titanate, and the components of the mix are so proportioned as to give a final product in which the numerical values of the correlated basicity and titanium-antimony ratios, as well as the molar proportion of antimony pentoxide, lie within Area D as shown on the accompanying graph and hereinbefore described, further characterized by the fact that from 1 to 10 per cent of calcium fluoride, based on the combined weight of said components is incorporated in the mix prior to calcination thereof.

23. The process defined by claim 1 wherein the calcination mix includes, in free or uncombined condition, at least one of the oxide components (calcium oxide, titanium oxide) of calcium titanate, and the components of the mix are so proportioned as to give a final calcined product in which the numerical value of the basicity ratio lies between the approximate limits 1.2 and 5.0, and that of the titanium-antimony ratio between the approximate limits 4.0 and 12.0, further characterized by the fact that the calcined product is washed, first with dilute acid and then with water, then dried and pulverized.

24. The process defined by claim 1, wherein the calcination mix includes uncombined titanium oxide, and the components of the mix are so proportioned as to give a final calcination product in which the numerical value of the basicity ratio lies between the approximate limits 1.2 and 3.0, and that of the titanium-antimony ratio between the approximate limits 4.0 and 8.8, while the molar proportion of antimony pentoxide lies between the approximate limits 0.12 and 0.60, further characterized by the fact that the calcined product is washed, first with dilute acid and then with water, then dried and pulverized.

25. The process defined by claim 1, wherein the calcination mix includes uncombined titanium oxide, and the components of the mix are so proportioned as to give a final calcination product in which the numerical value of the basicity ratio lies between the approximate limits 1.42 and 2.4, and that of the titanium-antimony ratio between the approximate limits 4.0 and 5.6, while the molar proportion of antimony pentoxide lies between the approximate limits 0.25 and 0.40, further characterized by the fact that the calcined product is washed, first with dilute acid and then with water, then dried and pulverized.

26. The process defined by claim 1 wherein the calcination mix includes, in free or uncombined condition, at least one of the oxide components (calcium oxide, titanium oxide) of calcium titanate, and the components of the mix are so proportioned as to give a final product in which the numerical values of the correlated basicity and titanium-antimony ratios, as well as the molar proportion of antimony pentoxide, lie within Area D as shown on the accompanying graph and hereinbefore described, further characterized by the fact that the calcined product is washed, first with dilute acid and then with water, then dried and pulverized.

27. The process defined by claim 1 wherein the calcination mix includes, in free or uncombined condition, at least one of the oxide components (calcium oxide, titanium oxide) of calcium titanate, and the components of the mix are so proportioned as to give a final calcined product in which the numerical value of the basicity ratio lies between the approximate limits 1.2 and 5.0, and that of the titanium-antimony ratio between the approximate limits 4.0 and 12.0, and wherein a quantity of calcium fluoride amounting to from 1 to 10 per cent of the combined weight of said components, or an equivalent quantity of some other suitable fluoride, is incorporated in the mix prior to calcination thereof; further characterized by the fact that the calcined product is washed, first with dilute acid and then with water, then dried and pulverized.

28. The process defined by claim 1, wherein the calcination mix includes uncombined titanium oxide, and the components of the mix are so proportioned as to give a final calcination product in which the numerical value of the basicity ratio lies between the approximate limits 1.2 and 3.0, and that of the titanium-antimony ratio between the approximate limits 4.0 and 8.8, while the molar proportion of antimony pentoxide lies between the approximate limits 0.12 and 0.60, and wherein from 1 to 10 per cent of calcium fluoride, based on the combined weight of said components is incorporated in the mix prior to calcination thereof; further characterized by the fact that the calcined product is washed, first with dilute acid and then with water, then dried and pulverized.

29. The process defined by claim 1, wherein the calcination mix includes uncombined titanium oxide, and the components of the mix are so proportioned as to give a final calcination product in which the numerical value of the basicity ratio lies between the approximate limits 1.42 and 2.4, and that of the titanium-antimony ratio between the approximate limits 4.0 and 5.6, while the molar proportion of antimony pentoxide lies between the approximate limits 0.25 and 0.40, and wherein from 1 to 10 per cent of calcium fluoride, based on the combined weight of said components is incorporated in the mix prior to calcination thereof; further characterized by the fact that the calcined product is washed, first with dilute acid and then with water, then dried and pulverized.

30. The process defined by claim 1 wherein the calcination mix includes, in free or uncombined condition, at least one of the oxide components (calcium oxide, titanium oxide) of calcium titanate, and the components of the mix are so proportioned as to give a final product in which the numerical values of the correlated basicity and titanium-antimony ratios, as well as the molar proportion of antimony pentoxide, lie within Area D as shown on the accompanying graph and hereinbefore described, and wherein from 1 to 10 per cent of calcium fluoride, based on the combined weight of said components is incorporated in the mix prior to calcination thereof; further characterized by the fact that the calcined product is washed, first with dilute acid and then with water, then dried and pulverized.

VIRGIL H. WAITE.
H. BURNHAM ALLPORT.

REFERENCES CITED

The following references are of record in the file of this patent:

UNITED STATES PATENTS

| Number | Name | Date |
| --- | --- | --- |
| 2,033,707 | Harshaw et al. | Mar. 10, 1936 |
| 2,199,794 | Harshaw et al. | May 7, 1940 |
| 2,200,170 | Harshaw et al. | May 7, 1940 |
| 2,189,148 | McIntyre et al. | Feb. 6, 1940 |
| 2,306,357 | Harbert et al. | Dec. 22, 1942 |
| 2,306,356 | Harbert et al. | Dec. 22, 1942 |

OTHER REFERENCES

Andrews, Enamels (1935), page 270.